(No Model.)

P. COOL.
CAR AXLE BEARING.

No. 326,955. Patented Sept. 29, 1885.

Witnesses:
Ed. L. Knostman.
John A. Allen

Inventor:
Peter Cool
per Henry W. Stackpole
Attorney.

United States Patent Office.

PETER COOL, OF MANHATTAN, KANSAS.

CAR-AXLE BEARING.

SPECIFICATION forming part of Letters Patent No. 326,955, dated September 29, 1885.

Application filed April 24, 1885. (No model.)

*To all whom it may concern:*

Be it known that I, PETER COOL, a citizen of the United States, residing at Manhattan, in the county of Riley and State of Kansas, have invented certain new and useful Improvements in Axle and Shaft Bearings, whereby to lessen friction and prevent heating; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Figure 1:
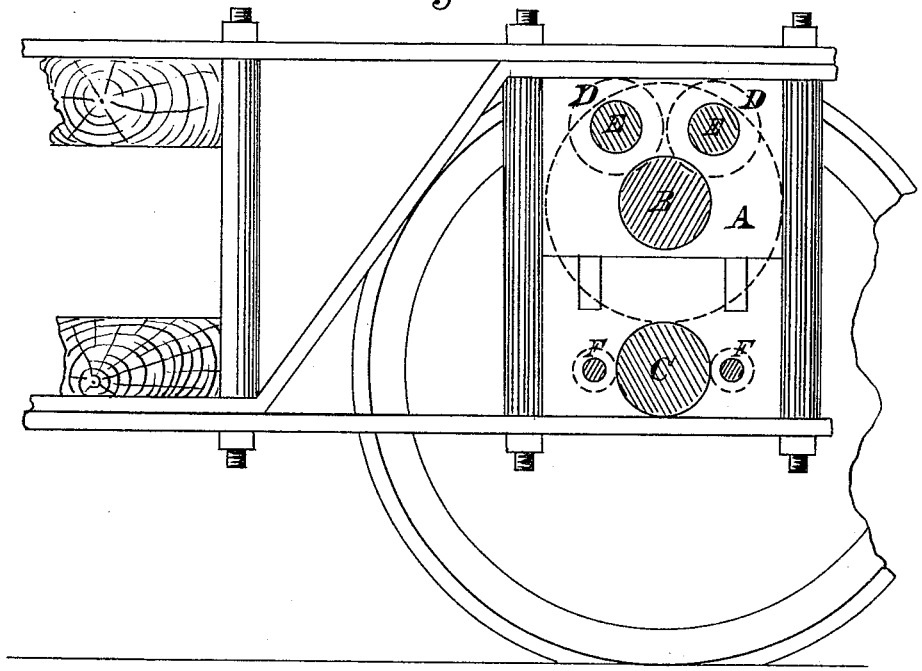
Figure 2:
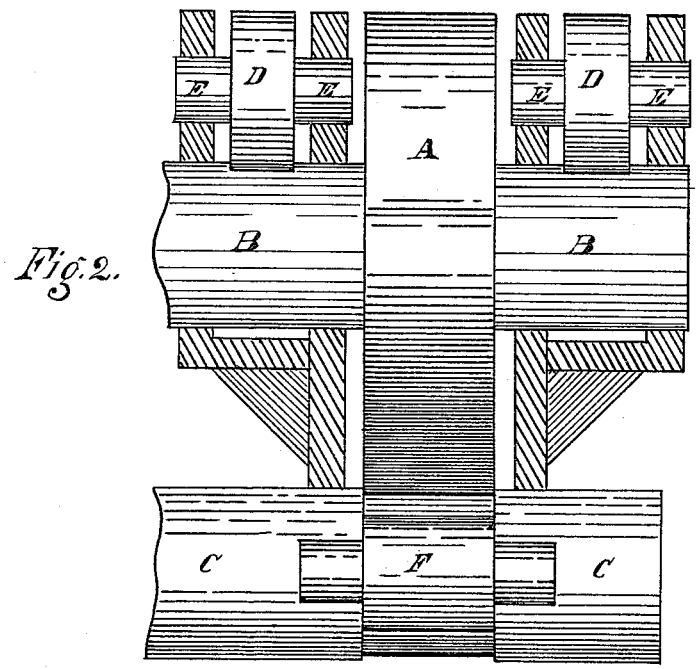

Figure 1 is a side view, with the face of the boxing removed. Fig. 2 is a front or end view.

This invention relates to bearings for axles or shafting; and it consists, mainly, in substituting for the common journal-box a combination of anti-friction rollers or wheels with a roller or wheel of sufficient dimensions to bear the weight and strain likely to be placed upon the axle or shafting, and to reduce the number of revolutions of said roller or wheel to a minimum, as compared with the revolutions of said axle or shafting, thereby overcoming the friction and all danger of heating occasioned by rapid motion, and, as a consequence, requiring less power to propel the vehicle or machinery.

In the accompanying drawings I have illustrated my invention, with reference more particularly to a car-axle; but it will readily be seen that it is designed as well for any other axle or shafting of every description.

The large anti-friction roller or wheel A is so placed within the boxing as to receive the bearing of the axle C, which is slightly grooved to prevent shifting. The smaller anti-friction rollers or wheels D D are so placed as to serve as bearings for the journals B B. The journals E E have their bearings within the framework of the boxing.

I have illustrated two small anti-friction rollers or wheels, F F, one on each side of the axle C, to reduce the friction caused by lateral or springing motion of the axle; but more or one only may be used, or all dispensed with, as desired. I have also illustrated two small anti-friction rollers or wheels, D D, as a bearing for each journal of the larger roller or wheel A; but one only or more may be used, or all dispensed with, as desired. I believe, however, the best results will be obtained by constructing my invention as described and illustrated.

I provide for oiling the bearings of the journals of the smaller rollers or wheels D D by making an oil-duct through from the top of the boxing, or by a hole in the center of the journal E, with one or more little oil-ducts leading out to the surface of the journal.

I am aware that anti-friction rollers or wheels similar to those illustrated in the drawings, and marked D D, have been used for various purposes; but these I do not claim, except in combination as and for the purposes described.

Having thus described my invention, what I claim as new, and desire to secure by Letters Patent, is—

The combination, with the circumferentially grooved axle or shaft of the large anti-friction wheel located above and forming the bearing of the axle or shaft, and fitting or working in the groove thereof, to prevent lateral shifting, the two small rollers located at each side of the axle or shaft and mounted in the boxing above the journals of the large wheel and forming the bearings for said journals, and the small anti-friction wheels located on opposite sides of the axle or shaft and in contact therewith, substantially as described.

In testimony whereof I affix my signature in presence of two witnesses.

PETER COOL.

Witnesses:
G. P. COOL,
E. J. COOL.